(12) United States Patent  
Spindler et al.

(10) Patent No.: US 9,061,569 B2  
(45) Date of Patent: Jun. 23, 2015

(54) DOOR FOR RECREATIONAL OFF-HIGHWAY VEHICLE

(71) Applicant: Arctic Cat Inc., Thief River Falls, MN (US)

(72) Inventors: Jared Spindler, Newfolden, MN (US); Mark Esala, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 13/829,129

(22) Filed: Mar. 14, 2013

(65) Prior Publication Data

US 2013/0199097 A1     Aug. 8, 2013

Related U.S. Application Data

(63) Continuation-in-part of application No. 13/333,282, filed on Dec. 21, 2011, now Pat. No. 8,465,050.

(51) Int. Cl.
*B60R 21/06* (2006.01)
*B60J 5/04* (2006.01)

(52) U.S. Cl.
CPC .............. *B60J 5/047* (2013.01); *B60J 5/0487* (2013.01); *B60R 21/06* (2013.01)

(58) Field of Classification Search
USPC ........ 280/749, 748; 296/146.11, 146.5, 146.6
See application file for complete search history.

(56) References Cited

U.S. PATENT DOCUMENTS

| | | | |
|---|---|---|---|
| 5,290,086 A | 3/1994 | Tucker | |
| 5,462,308 A | 10/1995 | Seki et al. | |
| 5,660,414 A | 8/1997 | Karlow et al. | |
| 5,707,075 A | 1/1998 | Kraft et al. | |
| 5,713,624 A | 2/1998 | Tower | |
| 5,879,048 A | 3/1999 | Tower | |
| 6,890,036 B2 | 5/2005 | Wiener et al. | |
| 6,966,600 B2 * | 11/2005 | Moriyama | 296/146.1 |
| 7,097,237 B2 | 8/2006 | Weiner et al. | |
| 7,530,623 B2 * | 5/2009 | Hampel | 296/146.11 |
| 8,292,352 B2 | 10/2012 | Furman et al. | |

* cited by examiner

*Primary Examiner* — Drew Brown
(74) *Attorney, Agent, or Firm* — Lowe Graham Jones PLLC

(57) ABSTRACT

A door and an integrated safety net system for a recreational vehicle having a chassis with a step-through door opening. The door includes a forward end and a rearward end, and a hinge coupled between the rearward end of the door and the chassis of the vehicle. A door panel or upper and lower safety nets are coupled to the door frame forward of the hinge and coupled to the chassis of the vehicle on or rearward of the rearward side of the door opening. The safety net and the door are collectively and cooperatively movable as the rear-hinged door moves to the open position or closed position. The door includes a latch at the forward end of the door to provide one operational step to release or secure the door and the integrated safety nets to the chassis upon ingress or egress of the vehicle.

20 Claims, 9 Drawing Sheets

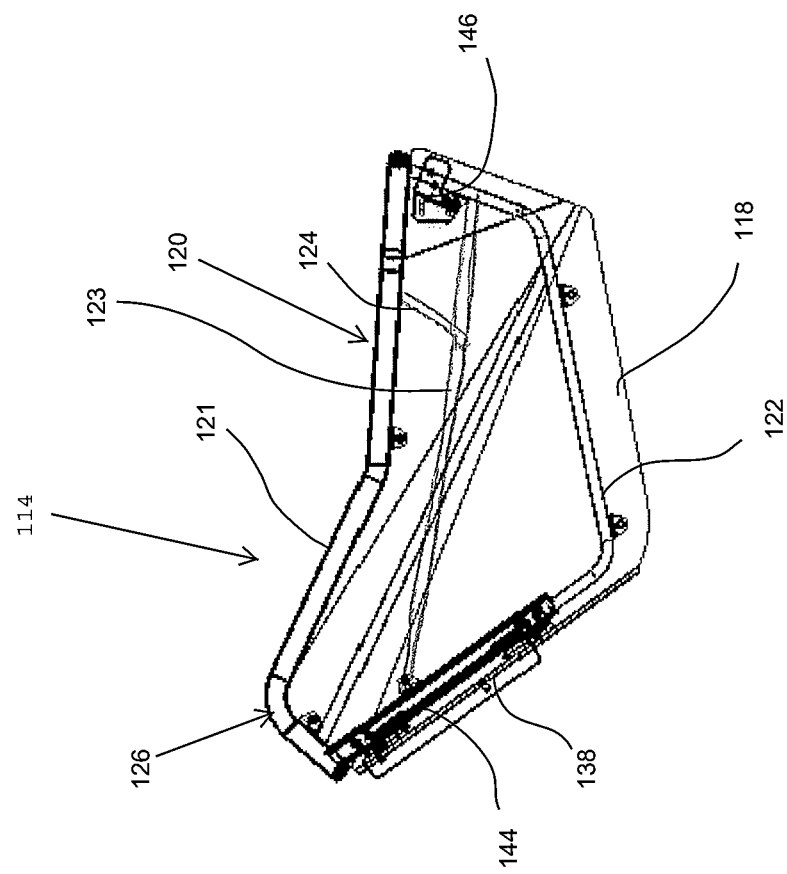

DOOR FOR RECREATIONAL OFF-HIGHWAY VEHICLE

PRIORITY CLAIM

This application is a continuation-in-part of U.S. application Ser. No. 13/333,282 entitled INTEGRATED SAFETY NET FOR VEHICLE, filed on Dec. 21, 2011, the contents of which are hereby incorporated by reference.

FIELD OF THE INVENTION

The present invention relates generally to a vehicle safety device, and more particularly, to an integrated safety net for a recreational vehicle to improve safety regarding potential bodily injury to riders.

BACKGROUND OF THE INVENTION

Four-wheeled recreational vehicles have become increasingly popular in recent decades. The acceleration rate and overall versatility of such vehicles has also increased in recent years, which have led to increased accidents and roll-overs. Because of the lack of effective use of safety features, when a four-wheeled recreational vehicle experiences a roll-over, riders may suffer serious bodily injury because they either instinctively extend limbs outside of the perimeter of the vehicle in an attempt to catch their fall, or their limbs are thrust outside the perimeter of the vehicle by the momentum and tossing of the vehicle, thereby causing severe injuries to exposed limbs. In extreme scenarios, riders can be thrust out of the sides of recreational vehicles due to a lack of use of sufficient safety features. Industry standards have been promulgated in an attempt to address the safety concerns of recreational vehicles in response to the frequency and severity of such injuries.

To reduce injuries to riders of recreational vehicles, safety devices and systems have been incorporated into these vehicles in the form of doors, cross members, and/or safety netting. Many of these systems, however, have various limitations related to weight/size restrictions and they require the rider to remove multiple components to enter the vehicle and then require the rider to fasten the multiple components upon entering the vehicle. Often, riders neglect to secure the safety devices or remove them altogether, rendering the safety features ineffective upon accidents, and thereby, exposing the rider to the aforementioned potential injuries.

Therefore, a need exists for an improved safety device to effectively prevent or minimize such injuries while providing a light-weight safety system that obviates the aforementioned problems with existing systems. The present invention provides an integrated safety net for recreational vehicles which overcomes the deficiencies of existing safety systems and which provides protection from bodily injury to the rider due to accidents and roll-overs. More specifically, the present invention includes at least one safety net coupled to the forward end of a rear-hinged door and to the rearward end of the chassis of a recreational vehicle near the door opening. The safety net and the door are integrated such that they cooperatively move as the door is opened and closed, thereby providing minimal operational steps to safely secure the net and the door to provide an improved safety device to protect the rider.

SUMMARY OF THE INVENTION

Embodiments of the present invention provide apparatuses, systems, and methods for protecting riders of recreational vehicles from potential bodily injury by including safety nets integrated with doors and the chassis of a vehicle. The invention provides the advantage of covering gaps in areas around the perimeter of the vehicle to prevent or reduce the likelihood that limbs or other body parts would suffer injury by extending beyond the perimeter of the vehicle in the event of a roll-over or other disturbance. The invention further provides the advantage of protecting the rider from potential injury due to external objects protruding into the sides of the vehicle, such as tree branches or other objects, thereby providing further protection to the lower and upper body parts of riders.

The preferred embodiment therefore includes an integrated safety net system for a recreational vehicle having at least one door disposed in a door opening, and a chassis for stepping through said door opening of said door. The system includes at least one hinge coupled between the rearward end of the door and the rearward end of the chassis. Upper and lower safety nets are coupled to door forward of the hinge and coupled to the chassis of the vehicle on or rearward of the rearward side of the door opening. The door includes a door frame, a door panel, and a release mechanism, whereby the release mechanism is a latch is coupled to the forward end of the door frame for securing the door to the forward end of chassis at the forward end of the door opening while the door is in the closed position. The latch is further provided for releasing the door from the chassis when desiring to open the door upon entry of the vehicle. The door, therefore, is a rear-hinged door with integrated safety nets that swing about the hinge and in a backward direction relative to the front of the vehicle.

Each safety net includes a net frame with mesh webbing secured within the net frame and a plurality of connection devices for attaching the safety nets to the door and the chassis at the respective locations described. The mesh webbing may be any type of mesh webbing or other suitable material to resist external forces in the event of an accident. The net frame may also be any suitable fabric or material capable of providing structural integrity and/or tensile strength to sufficiently resist external forces and thereby protect the rider from injury.

In a presently preferred embodiment, the upper safety net is coupled to the door forward of the hinge and coupled to the chassis of the vehicle on or rearward of the rearward side of the door opening by the connection devices. Similarly, the lower safety net is coupled to the door forward of the hinge and to the chassis of the vehicle on or rearward of the rearward side of the door opening by the connection devices. With the integrated upper and lower safety nets configured in such manner, the safety nets and the door are cooperatively movable as the door moves to the open position or the closed position, thereby providing minimal operational steps to provide the integrated safety net system to improve safety while riding in the vehicle. It will be appreciated that the safety net system may comprise of just one safety net coving the same area as compared to the two safety nets described herein, or it may comprise multiple safety nets integrated into the door and chassis.

In a presently preferred embodiment, the attachment systems each comprise a strap coupled to the perimeter of the net frame, such as an elastic strap or other member for connecting the net frame to the vehicle to allow flexibility and appropriate freedom of minimal movement of the safety nets while operating the door or in the event of an accident. An adjustable device may be coupled to the stretchable member for allowing adjustment of the length of the stretchable member, thereby also providing capability of adjusting tension of the safety nets. The adjustable device may be any suitable plastic-type strap adjustment device, hook and loop system, button system, or other system capable of adjusting the length of said member. Alternatively, the net frame can be directly coupled to the vehicle without the need of stretchable members, adjustment devices, or other elements described herein.

In the presently preferred embodiment, each connection device is coupled at its first end to the distal end of the strap for coupling the strap to the vehicle. The second end of the connection device is coupled to a mounting system for securing the nets to the door or the chassis of the vehicle at their respective locations. The mounting system may comprise a mounting bracket including a hole and a fastener through said hole, and the fastener coupled to the connection device. Alternatively, the mounting system may be a fastener disposed through a hole in the door frame or the chassis for coupling the connection device to the door or chassis. In an alternate embodiment, the mounting system may be a clamp or other suitable device for securing the connection device to the door or chassis. The mounting system with the mounting bracket described above allows the connection device to pivot while the door is moved or upon an accident, thereby reducing stress or tension on the components of the safety net system. It will be appreciated that any suitable means of connecting the safety nets to the door or chassis could be incorporated into the system, such as simply looping a strap around the door frame or chassis and securing the strap to itself. In one preferred embodiment, the net frame, mesh webbing, and straps are comprised of fabric strong enough to provide the intended safety features. Said components may also be comprised of material that minimizes retention of moisture and that reduces potential for corrosion, such as nylon fabrics or other materials know to maintain these characteristics. In another preferred embodiment, the attachment systems may comprise removable connection devices coupled to the safety nets so that the safety nets may be replaced or repaired.

In the presently preferred embodiment, the upper safety net comprises upper first and second connection devices coupling the upper safety net to the door at the middle and forward end of the door frame. In addition, upper third and fourth connection devices couple the upper safety net to the chassis on or rearward of the rearward side of the door opening and above the hinge. Similarly, the lower safety net comprises a lower first, second, and third connection devices, said connection devices coupling the lower safety net to the door at a forward, middle, and rearward end of the door frame, all devices being forward of the hinge. The lower safety net further comprising a lower fourth connection device coupled to the chassis on or rearward of the rearward side of the door opening and below the hinge. Therefore, the upper safety net, the lower safety net, and the door collectively provide protection to the rider and are cooperatively movable as door moves to the open or closed positions.

In the presently preferred embodiment, the net frame of the upper and lower safety nets is configured in the shape of polygons. The perimeter of each net frame has edges substantially parallel and in close proximity to corresponding surfaces of the vehicle panel, the door frame, and the chassis to provide optimum protection to the rider by preventing body parts from extending beyond the perimeter of the vehicle, specifically between the safety nets and corresponding components of the vehicle. Alternatively, the net frame may be other shapes or have differing edges, such as arcs or combinations thereof. In a further alternate embodiment, the safety net may be the door and still provide the improved safety features described herein. Furthermore, the safety nets could be incorporated into other possible rotatable systems of a vehicle, such as a windshield system or trunk/hatch-back safety system to protect riders or equipment/part contained within the vehicle.

In a preferred embodiment, while the door and safety nets are rotated about the hinge, the upper safety net has a first rotational axis, the lower safety net has a second rotational axis, and the door has a third rotational axis, wherein said rotational axes are substantially fixed relative to each other as the door and the safety nets cooperatively and collectively rotate to the open or closed positions.

The present invention also achieves many of the same safety objectives with a door for a recreational off-highway vehicle. The vehicle includes a chassis with a step-through door opening having a rearward side and a forward side. The vehicle is configured to carry occupants on seats in a side-by-side configuration. The seats have upwardly facing lower seat support surfaces and seat backs. The seat backs have a shoulder region approximately 17 inches from the upwardly facing surface of the lower seat support surfaces.

The door includes a forward end and a rearward end. A hinge couples the door to the chassis of the vehicle at the rearward side of the door opening. A rearward portion of the door is slightly forward of and laterally outboard of the shoulder region of the seat back. A forward portion of the door extends forwardly and downwardly from the rearward portion to a vertical height below the shoulder region of the seat back. A latch at the forward end of the door engages a receiver at the forward side of the door opening. An upper frame member extends along a top of the door from the forward end to the rearward end. The door also includes a door panel secured to the upper frame member. The upper frame member extends downwardly from the rearward portion to a door mid-portion.

BRIEF DESCRIPTION OF THE DRAWINGS

Preferred and alternative examples of the present invention are described in detail below with reference to the following drawings:

FIG. 8 is a side-elevational view of the interior of the front doors shown in FIG. 7.

DETAILED DESCRIPTION OF THE PREFERRED EMBODIMENT

By way of overview, the present invention provides apparatuses, systems, and methods for improving safety in recreational vehicles that include side doors regarding potential bodily injury to riders due to accidents or roll-overs. The improved safety system includes at least one safety net coupled to a rear-hinged door and coupled to the chassis of a recreational vehicle. The safety nets and the door are integrated and cooperatively move as the door is rotated to the open or closed positions, thereby providing minimal operational steps to secure or remove the safety nets when the driver or passenger enters or exits the vehicle. The system thereby provides durable, lightweight safety nets with sufficient coverage to protect limbs and other body parts of the rider in the event of an accident.

Each safety net comprises a net frame coupled to the door forward of the door hinge and to the chassis to the rear of the driver and passenger bay. The net is connected in some locations by connection devices coupled by fasteners to the door frame or the chassis. The net frames are preferably polygons with edges substantially parallel to surfaces of the door and chassis to provide optimum protection to riders.

Figure 1:
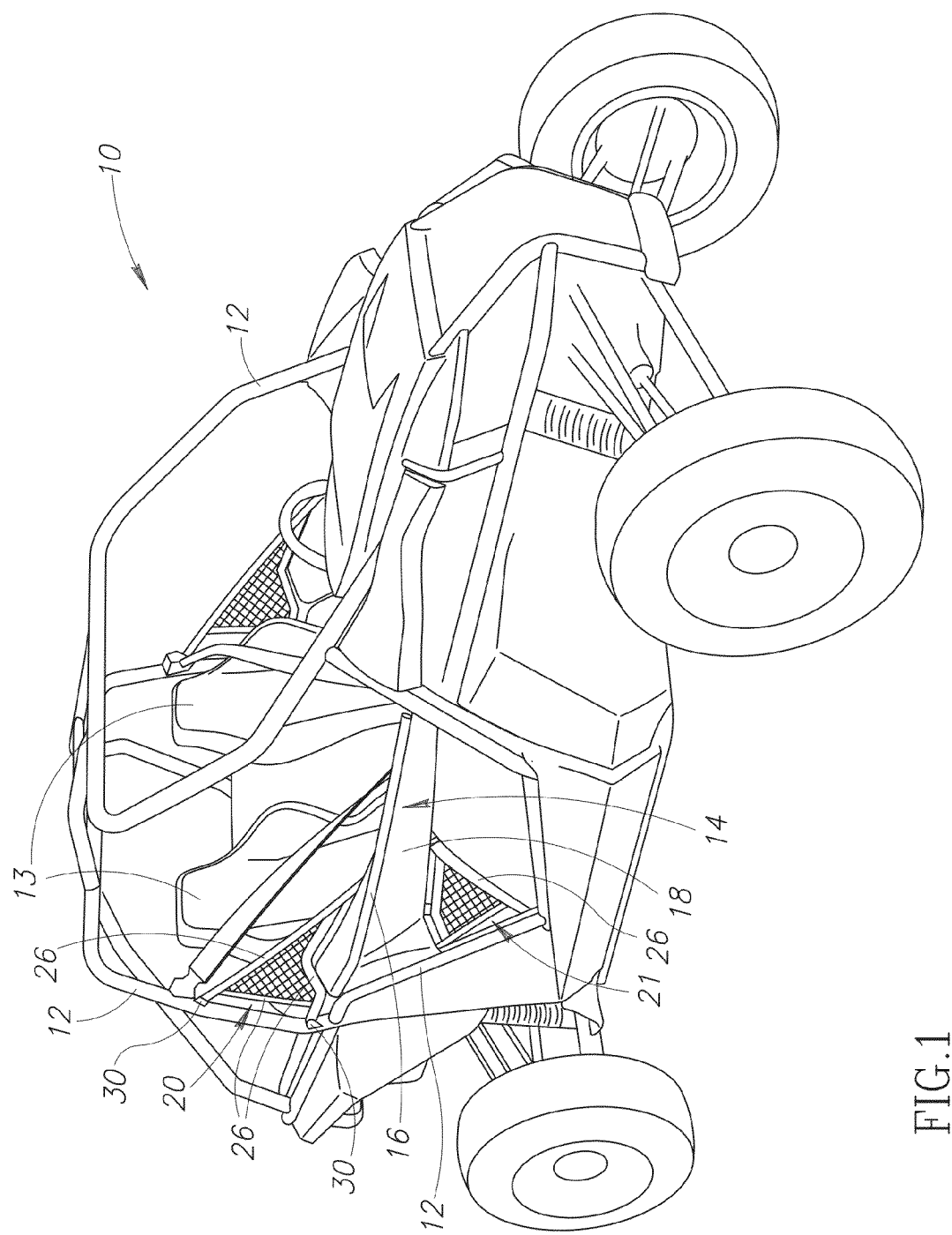
FIG. 1 is perspective view from the front of the vehicle including integrated safety net systems on the driver's side door and the passenger's side door.
Figure 2:
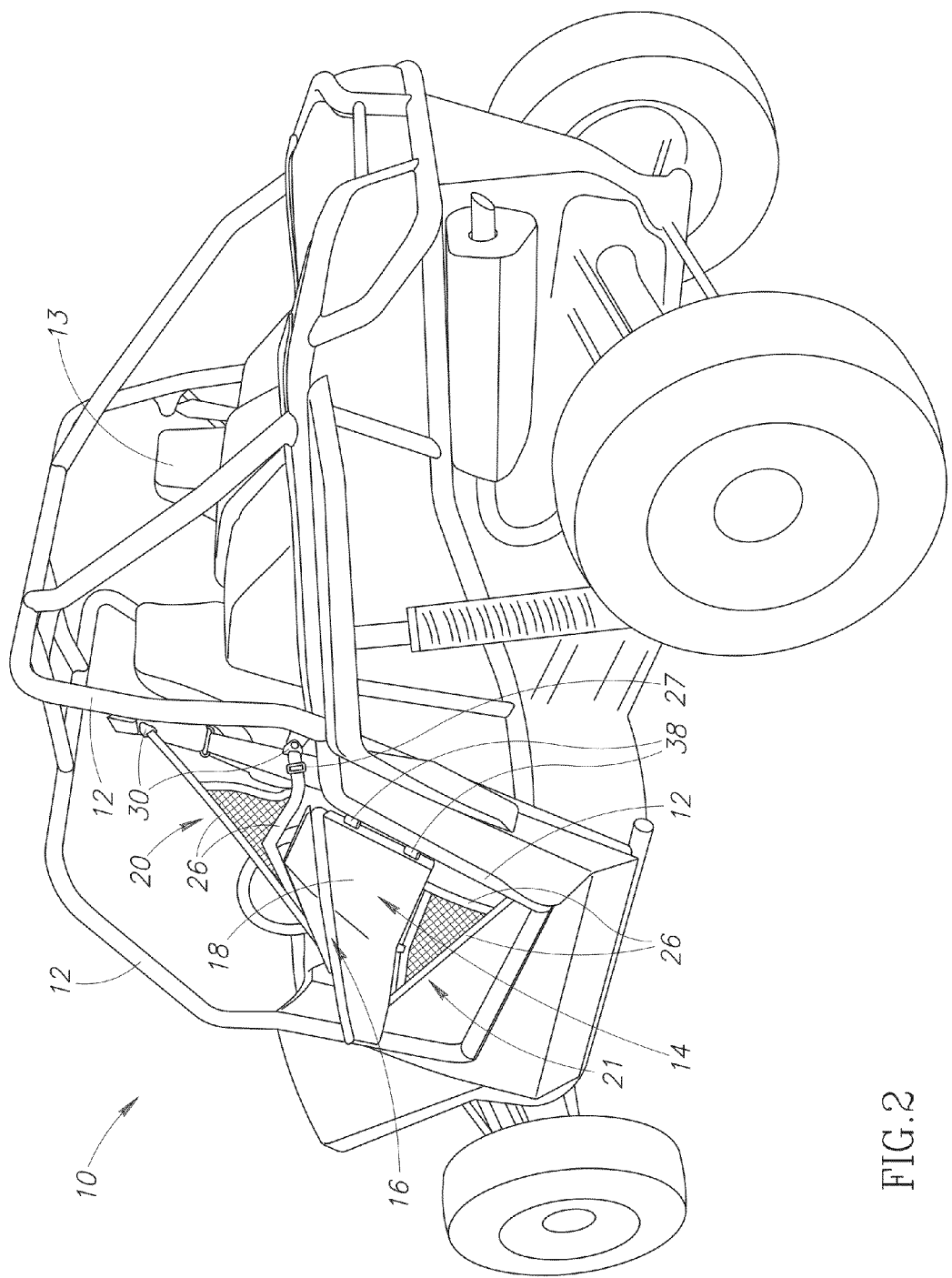
FIG. 2 is perspective view from the rear of the vehicle including integrated safety net systems on the driver's side door and the passenger's side door

FIGS. 1 and 2 illustrate a vehicle 10 including a chassis 12, doors 14, vehicle headrests 13, hinges 38, upper safety net 20, and lower safety net 21 (the doors and safety nets being in the closed position). Door 14 includes a door panel 18 coupled to a door frame 16 (see FIGS. 3 and 4A for a full view of door 14). According to a presently preferred embodiment, door 14 has a forward end and a rearward end with hinge 38 coupled between the rearward end of door 14 and chassis 12. It further includes upper safety net 20 coupled to door 14 forward of hinge 38 and coupled to chassis 12 on or rearward of the rearward side of a door opening 15 (see FIG. 4B). Similarly, lower safety net 21 is coupled to door 14 forward of hinge 38 and coupled to chassis 12 on or rearward of rearward side of door opening 15 (see FIG. 5 for a more detailed view of the safety nets coupled to the door and chassis). Upper safety net 20 is disposed in an upper position of door 14 to protect upper body parts from potential injury, and lower safety net 21 is positioned in a lower position of door 14 to protect lower body parts from potential injury.

FIG. 2 further shows an adjustable device 27 coupled to strap 26 of upper net 20 for allowing adjustment of the length of straps 26, thereby adjusting tension of the safety net and allowing flexibility as door 14 and safety nets 20 and 21 are collectively moved. The adjustable device 27 may be any suitable device for allowing adjustment of the length of strap 26. It will be appreciated that adjustable device 27 may be coupled to the straps or safety nets at other areas while providing the intended function.

Figure 3:
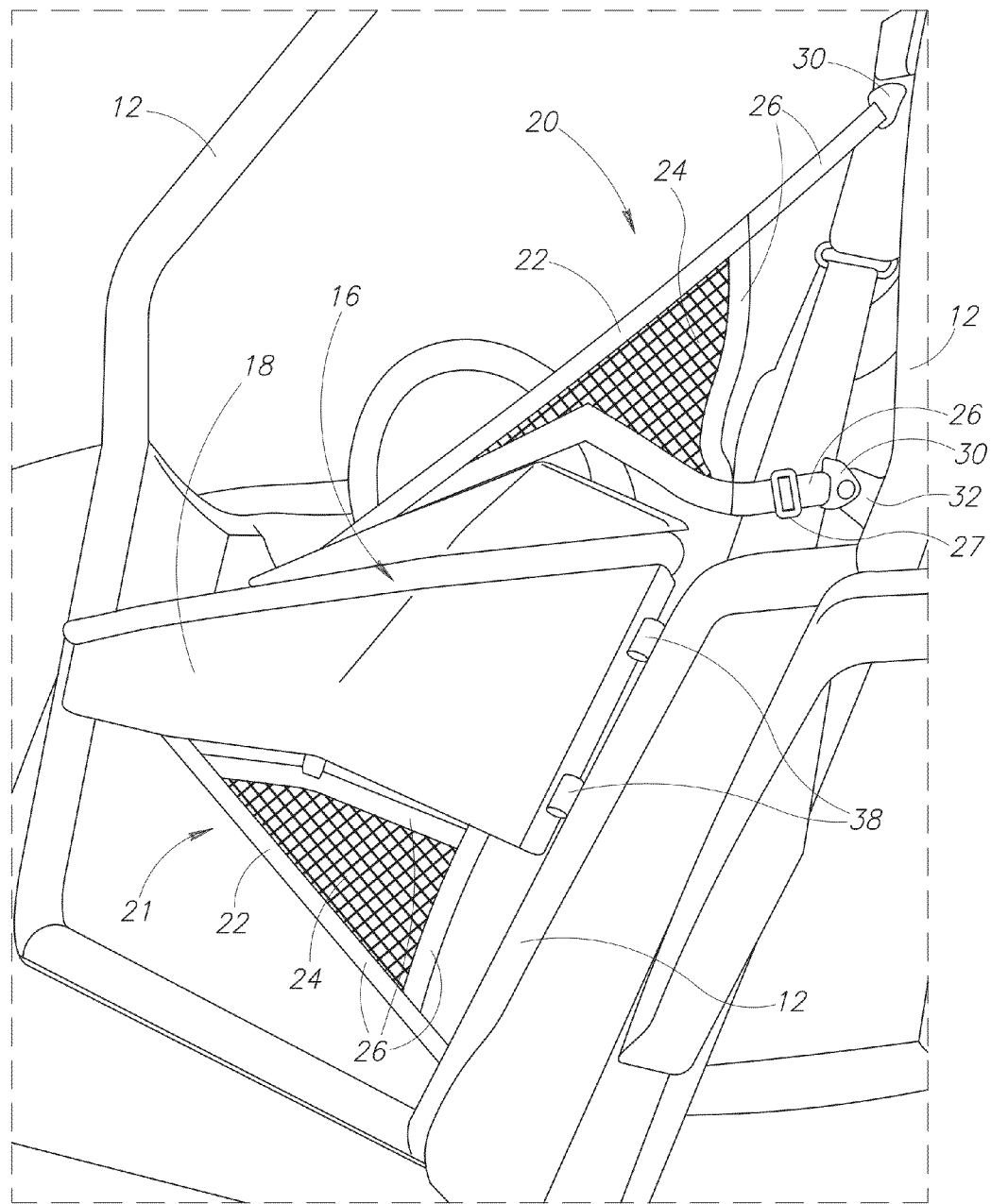
FIG. 3 is a perspective view of the driver's side door coupled to the chassis, the door and the upper and lower safety nets being in the closed position.

FIG. 3 illustrates a closer view of the safety net systems as integrated into the rear-hinged door. Door 14 includes upper and lower hinges 38 coupled to the rearward end of door 14, the door 14 being thereby coupled to the rearward side of door opening 15 of chassis 12 of vehicle 10. Hinge 38 allows door 14 to open about the rearward end of door 14. In the preferred embodiment, hinge 38 has an axis 44 that slopes rearwardly, such that door 14 is held open by gravity (see FIG. 4B in which the door is partially open). In a presently preferred embodiment, upper safety net 20 and lower safety net 21 include a net frame 22 and mesh webbing 24 secured within said net frame 22. Net frame 22 may be coupled by connection devices 30 to door 14 and to chassis 12 of vehicle 10 on or rearward of the rearward side of door opening 15.

Figure 4A:
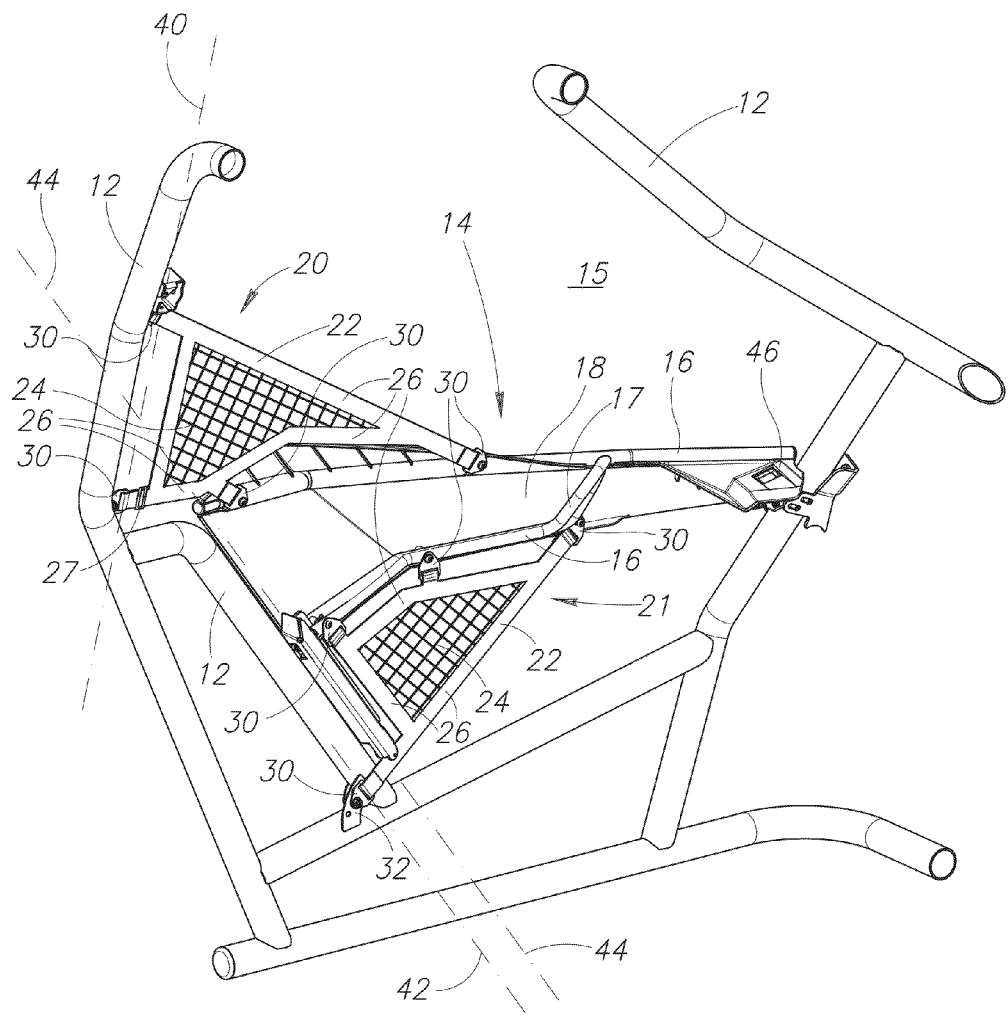
FIG. 4A is a cutaway view of the chassis from the interior vehicle perspective, showing the driver's side door with door and the upper and lower safety nets being in the closed position.
Figure 4B:
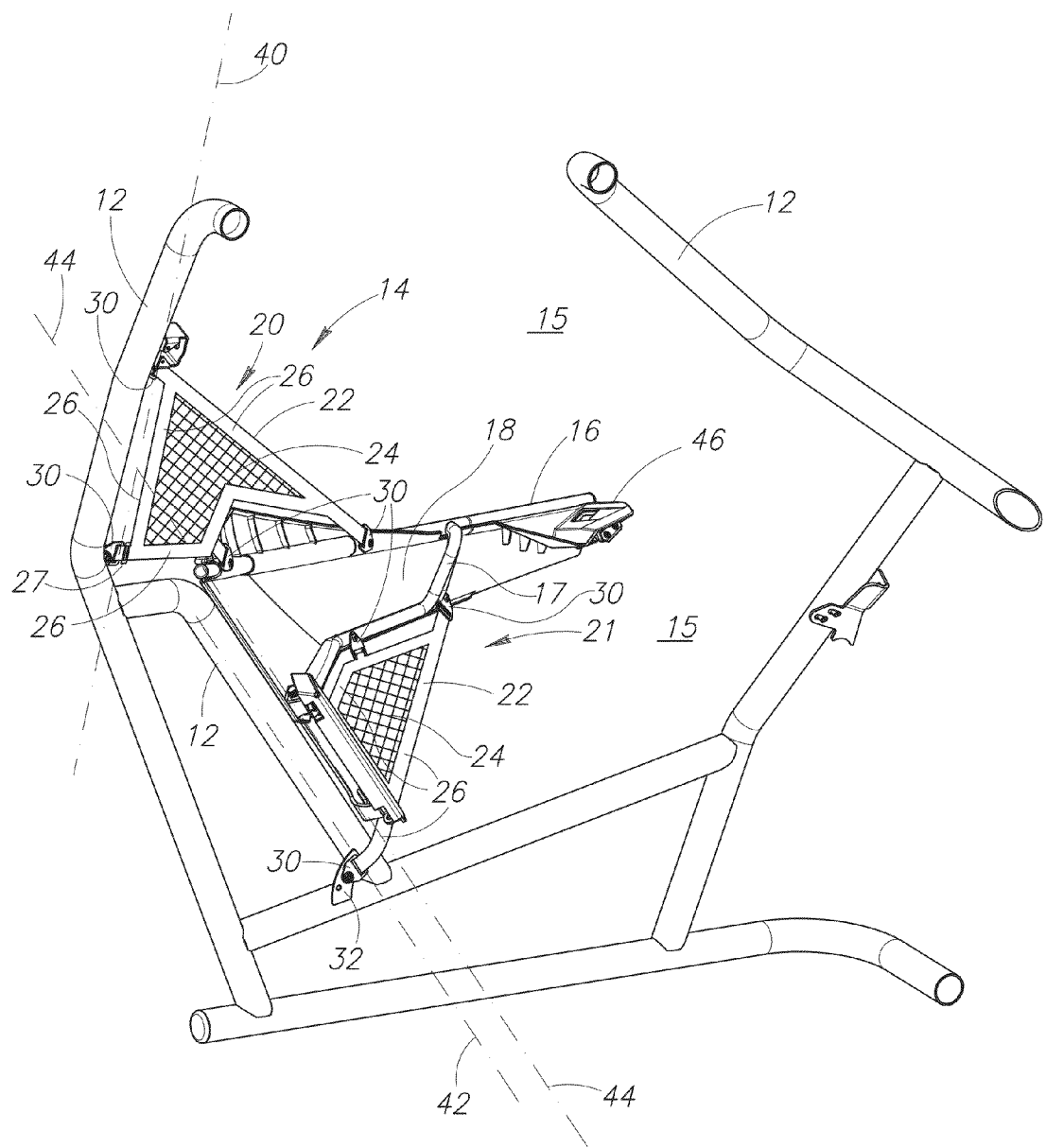
FIG. 4B is a cutaway view as shown in FIG. 4A, showing the door with door and the upper and lower safety nets being in the open position.

FIGS. 4A and 4B illustrate a more detailed view of the presently preferred embodiment from the interior view of the vehicle with door 14 in the closed position. A latch 46 is coupled to the forward end of door frame 16 for securing door 14 to the forward end of door opening 15 when door 14 is in the closed position. Latch 46 is similar to a seat belt latch. Having a latch system for the door and the integrated safety nets provides a single fundamental safety step to secure the safety nets and the door to the forward end of the chassis, thereby eliminating the likelihood of riders failing to secure a separate, unincorporated safety net system while entering or riding in the recreational vehicle, and thereby providing an improved safety device. Closing of the door engages latch 46 and places the safety nets in the proper location for driver and passenger safety. The user would have to take the steps of removing the nets to not have them in place. Yet there is no need for removal, since the nets do not interfere with the intentional entry or exit of the vehicle, operation of the vehicle, and do not obstruct proper vision.

In a presently preferred embodiment, upper safety net 20 comprises upper first and second connection devices 30 for coupling upper safety net 20 to door 14 near the rearward end of door 14 and the middle portion of door 14 respectively (both being forward of hinge 38). Upper safety net 20 further includes upper third and fourth connection devices for coupling upper safety net 20 to chassis 12 on or rearward of the rearward side of the door opening 15. Lower safety net 21 comprises a lower first connection device 30, a lower second connection device 30, and a lower third connection device 30. The connection devices couple lower safety net 21 to the door forward of hinge 38. Lower safety net 21 also includes a lower fourth connection device 30 coupling lower safety net 21 to chassis 12 on or rearward of the rearward side of the door opening 15. Note that the rearward end of upper safety net is secured to chassis 12 rearward and lateral of the vehicle seat headrest 13. Because chassis 12 includes door openings 15 for driver and passenger ingress and egress, the vehicle is easy to get in and out of by simply opening the door, without having to climb over a side bar. Preferably, the portion of the chassis to which the rearward end of upper safety net 20 attached also forms part of the vehicle roll cage.

FIGS. 4A and 4B further illustrate rotational axes of the hinge and safety nets. Specifically, upper safety net 20 has a first rotational axis 40, lower safety net 21 has a second rotational axis 42, and hinge 38 has a third rotational axis 44, wherein said rotational axes are substantially fixed relative to each other as door 14 and the safety nets 20 and 21 rotate to the open position or closed position. Upper and lower safety nets 20 and 21 include straps 26 vertically separated along chassis 12. The attachment points for rearward straps 26 is nearly in line with the axis of the door hinges, such that straps 26 are not excessively stretched when the door is open or closed. As some deviation from axes 44 occurs due to the particular configuration of the chassis, straps 26 that are not closely along axis 44 of rear hinge 38 preferably include some partially elasticized material. However such straps also include an elastic limit to provide the needed safety. The stretching of the net straps also serves to slow the rotation of the opening door just before it travels to its full open position.

FIGS. 4A and 4B show door 14 including a safety member being a hand grip 17 coupled to door frame 16 on the inward side of the door. Hand grip 17 provides an additional safety feature to allow riders to maintain their hands/arms inside the perimeter of the vehicle while riding. Hand grip 17 further provides a means for opening and closing the door upon releasing or securing latch 46. It will be appreciated that hand grip 17 may be positioned at other locations on door frame 16 while providing the intended purposes.

It is further shown in the figures that the net frames 22 of safety nets 20 and 21 are substantially configured in the shape of polygons. The perimeter of net frames 22 have edges substantially parallel and in close proximity to corresponding surfaces of vehicle panel 18, door frame 16, and chassis 12. This provides optimum protection to the rider by preventing body parts from extending beyond the perimeter of the vehicle, specifically between the safety nets and adjacent components of the vehicle.

Figure 5:
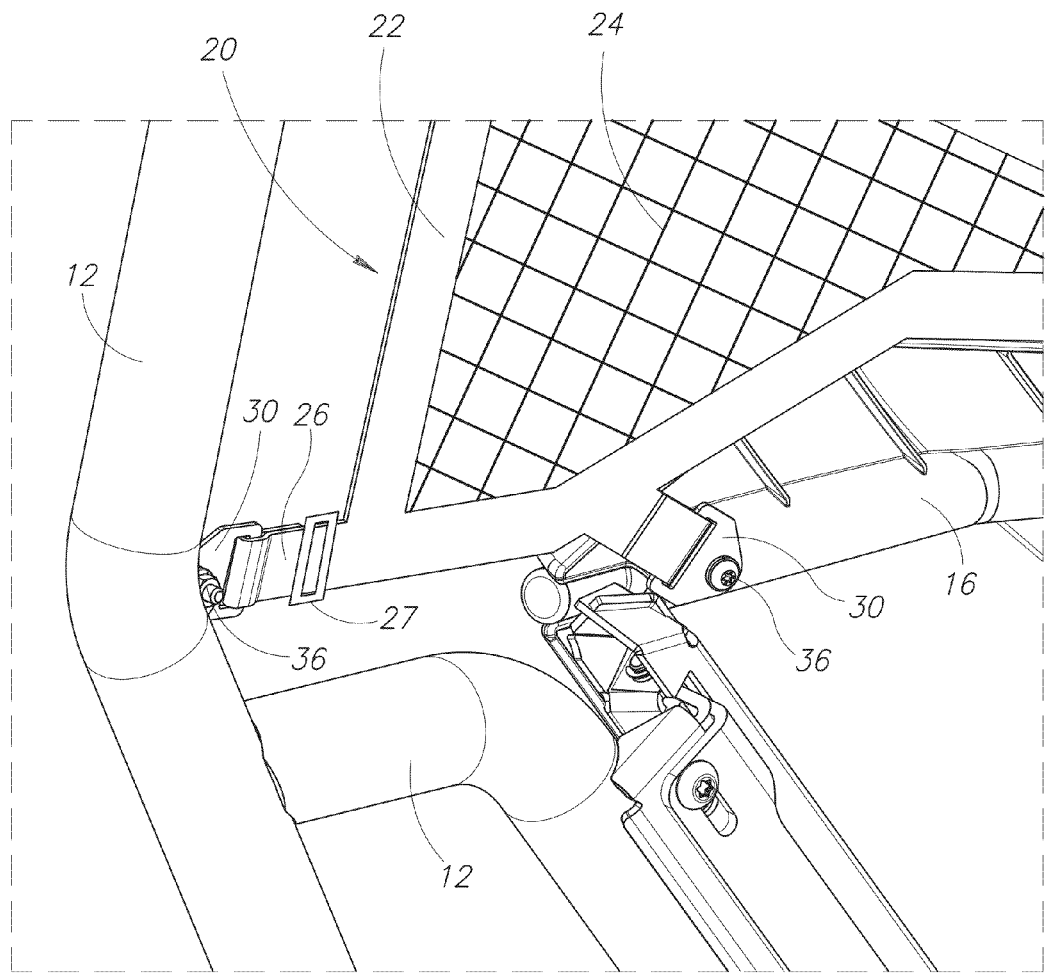
FIG. 5 is a close-up view of a connection device of the upper safety net from the interior perspective view of the vehicle.

FIG. 5 illustrates a more detailed view of the coupling of upper safety net 20 to door frame 16 and chassis 12. Straps 26 are coupled between net frame 22 and connection device 30. A first end of connection device 30 is coupled to the distal end of strap 26. At its second end, connection device 30 is coupled to a mounting system for securing strap 26 to either door 14 or to chassis 12 on or rearward of the rearward side of door opening 15. The mounting system may include a fastener 36 for coupling connection device 30 to the door or the chassis through holes in door frame 16 or chassis 12 (holes not shown). Alternatively, as shown at the lower rearward end of door opening 15, a mounting bracket 32 may be secured to chassis 12 for coupling to connection device 30 by fastener 36 (see FIG. 4B for example of mounting bracket 32). The mounting bracket 32 receives fastener 36 that is then coupled to the second end of connection device 30 by a hole in connection device 30 to permit proper alignment of the nets when installed.

Figure 6:
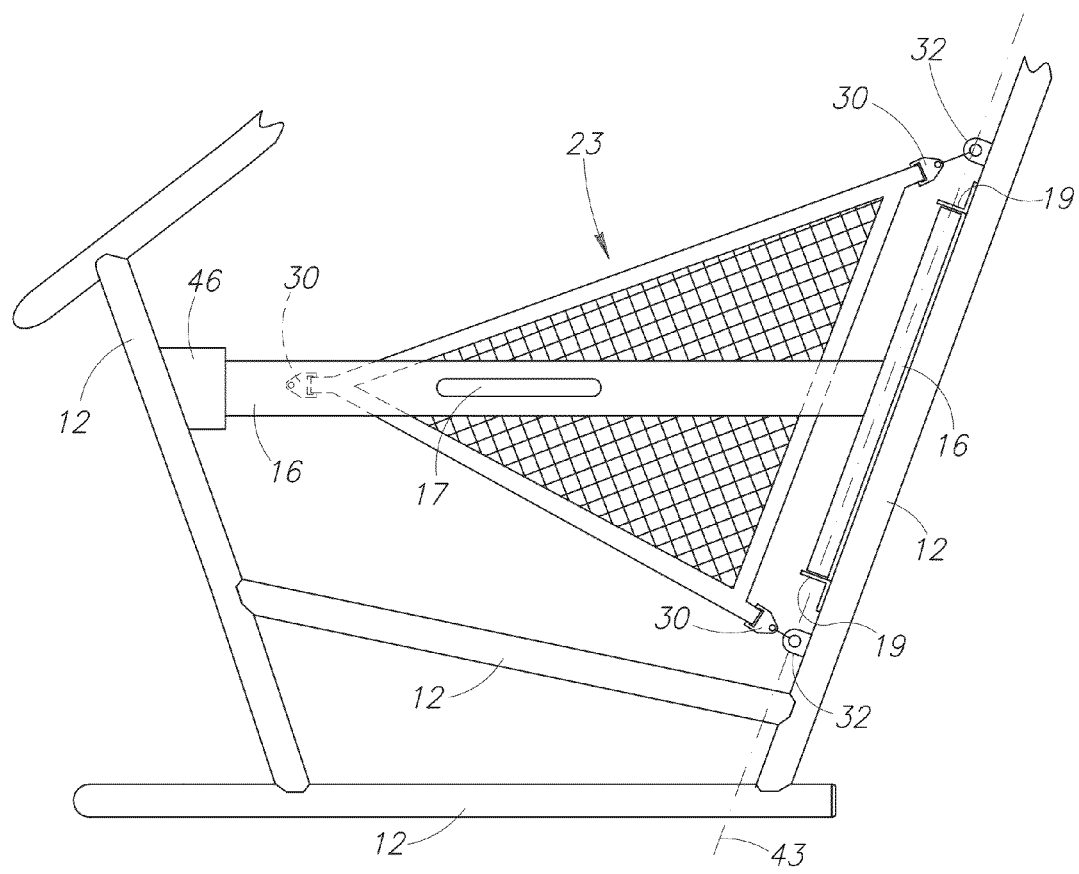
FIG. 6 is a cutaway view of the present invention from the interior perspective view, showing the passenger's side door having a single safety net.

FIG. 6 illustrates one embodiment of the present invention from an interior view of the passenger's side door having a single safety net. The safety net 23 is coupled at three connection points to door frame 16 and chassis 12. The first and second connection points are coupled at their lower and upper rearward ends to chassis 12 by connection devices 30 at brackets 32. The third connection point couples the forward end of safety net 23 to door frame 16 forward of the first and second connection points. Latch 46 is coupled to the forward end of door frame 16 as a means for cooperatively opening and closing the door and the safety net 23. Hand grip 17 is coupled to the interior portion of door frame 16. The rearward end of door frame 16 is pivotally coupled to chassis 12 by brackets 19 for rotating door frame 16 and safety net 23 to the open or closed position about a single rotational axis 43. Alternatively, the rearward ends of net 23 is secured to the rearward upper and lower portions of door frame 16, for example, just inboard of brackets 19.

Embodiments of the present invention also include a method of improving safety regarding potential for bodily injury to riders of a recreational vehicle, the improvement including the steps comprised of releasing and securing the integrated safety nets and the door to chassis to protect the rider, as previously described in connection with FIGS. 1-5.

Figure 7:
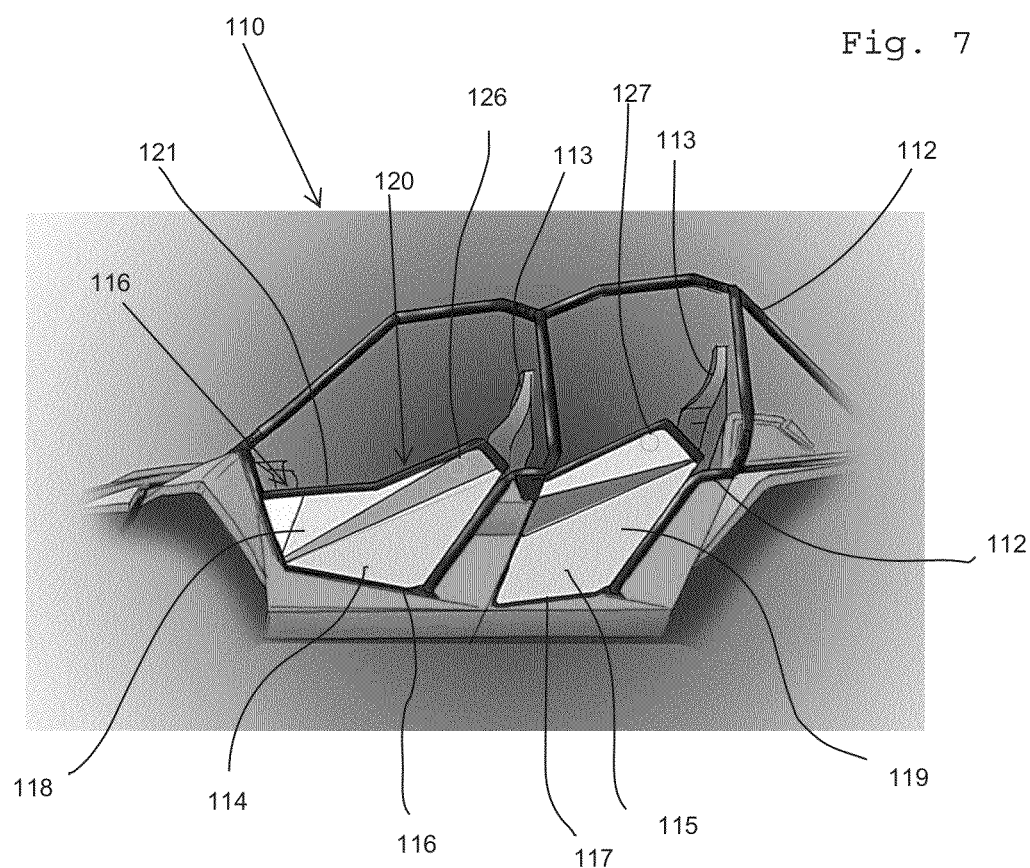
FIG. 7 is a side-elevational view of a portion of a vehicle with doors providing occupant containment features.

FIGS. 7 and 8 illustrate a further embodiment of doors 114, 115 for a vehicle 110 that provides protection for the occupants with or without nets added thereto. As seen in FIG. 7, the upper perimeter of the doors 114, 115 extend upwardly as they extend rearwardly. In this manner the doors 114, 115 provide shoulder and arm/hand retention for the occupants while still allowing good visibility. The areas of the doors that extend the highest 126, 127 are also the areas that are closest to the heads of the occupants. Thus, the occupants can easily see over and past the top of the doors. As the top of the doors extend forward, they are slightly lower, providing good visibility of the ground and potential obstacles that the vehicle may be approaching.

The shoulder retention provided by the door is passive in that the user does not have to secure a latch or other device other than closing the door to have the shoulder retention in place. Closing the door upon entry into the vehicle will be natural, as the vehicle would not be driven with the door open. Of course, seat belts will aid in keeping the occupants within the vehicle in a desired location, such that the occupants' shoulders are adjacent the upper portions 126, 127 of the door 114, 115.

With the rise 126, 127 in the door at about the shoulder of the occupant, the upper net described above may not be necessary. Thus, the door is simplified in this manner.

Preferably, the part of the door adjacent the occupant shoulder is at least slightly greater than 17 inches measured from the lowest point on the seating surface parallel to the seat back. Most preferably the distance from the lowest point on the lower seating surface to the height of the door adjacent the shoulder of the occupant is approximately 19 inches. This height is preferably measured about 6 inches forward of the seat back. In some embodiments, the door may continue to rise rearward of this location.

As seen in FIG. 8, a door frame 120 is provided on the inside of a door panel 118. The panel 118 is preferably constructed of plastic or aluminum, but may be of other materials, such as fiberglass or other composites. The door frame 120 is preferably constructed of steel tubing. An upper frame member 121 extends along the upper perimeter of the door panel 118, 119 from front to rear. This upper frame member 121 provides support to the door panel and ensures proper shoulder retention for the adjacent occupant. The upper frame member 121 extends from near a latch 146, 147 in the front to near the hinge 138, 139 or other support member extending from the hinge in the rear. Thus, a strong bridge is created for occupant safety and retention.

On the front door 114, the upper frame member 121 extends from a highest portion 126 adjacent the should of the occupant. The door covers a shoulder region 126 about six inches forward of the seat back and about 17 inches above the upper surface of the seat lower cushion. From here, the upper frame member extends slightly downwardly as it extends forwardly to at least a mid-portion of the door. At the mid-portion of the front door 114, the slope of the upper frame member 121 lessens as it extends to the forward end of the door. This arrangement provides good occupant retention for the shoulder, arm, and hand while still providing good visibility. The lower portion of the door also provides good leg and foot retention.

The door frame 120 also includes a lower frame member 122 and a mid frame member 123. Hinges 138, 139 are secured to the lower frame members 122. The hinge axis 144 extends along the rearward portion of the lower frame member 122. This axis 144 is approximately parallel (or in the same general direction) as the seat back. The mid frame member 123 extends from the front of the lower frame member 122 below the latch 146 to the rear portion of the lower frame member 122 adjacent the hinge 138. A hand grip 124 is preferably extends from the door frame 120, extending from the upper frame member 120 to the lower frame member 123. The hand grips on either side of the vehicle provide convenient locations to close the door for the driver and to hold onto for the passenger.

Other than the change in slope at the mid-portion and some dimensions to fit the rear door opening 117, the rear door 115 is similar. The tall doors extending up and forming the shoulder portions provide safety and visibility with an efficient construction that minimizes parts.

While the preferred embodiments of the invention have been illustrated and described, as noted above, many changes can be made without departing from the spirit and scope of the invention. The safety door system described herein could also be incorporated into other "doors" of a vehicle, such as a rear door or trunk system to protect from bodily injury or to contain and/or protect parts and equipment. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A door for a recreational off-highway vehicle having a chassis with a step-through door opening, the vehicle being configured to carry occupants on seats in a side-by-side configuration, the seats having upwardly facing lower seat support surfaces and seat backs, the seat backs having a shoulder region approximately 17 inches above the upwardly facing surface of the lower seat support surfaces, the door comprising:
   a forward end and a rearward end;
   a hinge secured directly to the chassis of the vehicle and positioned between the rearward end of the door and a rearward side of the step-through door opening of the chassis of the vehicle, wherein the hinge has a pivot axis that slopes rearwardly such that the door is held open by gravity;
   a shoulder retention portion slightly forward of and laterally outboard of the shoulder region of the seat back;
   a forward portion extending forwardly and downwardly from the shoulder retention portion to a vertical height below the shoulder region of the seat back.

2. The door of claim 1, further comprising an upper frame member extending along an upper perimeter of the door, from above the shoulder region to the forward end of the door.

3. The door of claim 2, further comprising a mid-frame member extending below the upper frame member, the mid-frame member securing an interior handle for the occupant.

4. The door of claim 2, further comprising a mid-frame member and a door panel, the mid-frame member extending below the upper frame member, the mid-frame member and the upper frame member securing the door panel.

5. The door of claim 2, wherein a door panel extends from the upper frame member to a lower perimeter of the step-through door opening.

6. The door of claim 2, wherein the upper frame member extends forwardly and downwardly from the shoulder region to a door mid-region, in the door mid-region the upper frame member angles to a lesser slope as it extends forward to the forward end of the door.

7. The door of claim 1, wherein when an occupant is sitting in one of the seats, the shoulder retention portion of the door is adjacent to the occupants' outboard shoulder and is approximately 6 inches forward of the seat back and at least 17 inches above the upwardly facing lower seat support surface such that the shoulder retention portion provides passive retention of the occupant's outboard shoulder.

8. The door of claim 7, wherein the shoulder retention portion of the door is approximately 19 inches from the upwardly facing lower seat support surface.

9. The door of claim 1, wherein when an occupant is sitting in one of the seats, a highest part of the door is adjacent to the occupant's head to enable visibility of terrain forward of the vehicle.

10. The door of claim 1, wherein the rearward end is at a height that is lower than another height of a highest part of the door.

11. The door of claim 1, further comprising a latch at the forward end and the hinge is at the rearward end, such that the door opens rearwardly.

12. The door of claim 1, wherein the pivot axis is longitudinally rearward of a forward face of the seat back along an axis tilted in approximately the same direction as the seat back forward face.

13. The door of claim 1, wherein when an occupant is sitting in one of the seats and the door is closed, the shoulder retention portion is adjacent to the occupant's outboard shoulder and provides passive retention of the occupant's outboard shoulder.

14. A door for a recreational off-highway vehicle having a chassis with a step-through door opening having a rearward side and a forward side, the vehicle being configured to carry occupants on seats in a side-by-side configuration, the seats having upwardly facing lower seat support surfaces and seat backs, the seat backs having a shoulder region approximately 17 inches above the upwardly facing surface of the lower seat support surfaces, the door comprising:
   a forward end and a rearward end;
   a hinge secured directly to the chassis of the vehicle and positioned between the rearward end of the door and a rearward side of the step-through door opening of the chassis of the vehicle at the rearward side of the door opening, wherein the hinge has a pivot axis that slopes rearwardly such that the door is held open by gravity;
   a shoulder retention portion slightly forward of and laterally outboard of the shoulder region of the seat back;
   a forward portion extending forwardly and downwardly from the shoulder retention portion to a vertical height below the shoulder region of the seat back;
   a latch at the forward end of the door that engages a receiver at the forward side of the door opening;
   an upper frame member extending along a top of the door from the forward end to the rearward end.

15. The door of claim 14, further comprising a door panel secured to the upper frame member.

16. The door of claim 14, wherein the upper frame member extends downwardly from the shoulder retention portion to a door mid-portion.

17. The door of claim 14, wherein when an occupant is sitting in one of the seats and the door is closed, the shoulder retention portion is adjacent to the occupant's outboard shoulder and provides passive retention of occupant's outboard shoulder.

18. A door for a recreational off-highway vehicle having a chassis with a step-through door opening, the vehicle being configured to carry at least one occupant on at least one seat, the at least one seat having upwardly facing lower seat support surfaces and a seat back, the seat back having a shoulder region above the upwardly facing surface of the lower seat support surfaces, the door comprising:
   a forward end and a rearward end;
   an upper safety frame that includes an upper safety net and a first rotational axis;
   a lower safety frame that includes a lower safety net and a second rotational axis;
   a hinge that includes a third rotational axis and couples the door to the chassis of the vehicle, wherein the first rotational axis, the second rotational axis, and the third rotational axis are substantially fixed relative to each other as the door and the safety frames cooperatively rotate to an open and a closed position;
   a shoulder retention portion laterally outboard of the shoulder region of the at least one seatback and when the at least one occupant is sitting in the at least one seat, the shoulder retention portion is adjacent to the at least one occupant's outboard shoulder such that the shoulder retention portion provides retention of the at least one occupant's outboard shoulder; and a forward portion extending forwardly and downwardly from the shoulder retention portion to a vertical height below the shoulder region of the seat back enabling visibility of the ground.

19. The door of claim 18, wherein the shoulder retention portion provides passive retention of the at least one occupant's outboard shoulder when the at least one occupant is sitting in the at least one seat and the door is closed.

20. The door of claim 18, wherein the hinge has an axis that slopes rearwardly such that the door is held open by gravity.

\* \* \* \* \*